United States Patent
Baba et al.

(10) Patent No.: US 8,528,826 B2
(45) Date of Patent: Sep. 10, 2013

(54) WIRELESS TAG AND MANUFACTURING METHOD

(75) Inventors: Shunji Baba, Kawasaki (JP); Shigeru Hashimoto, Tokyo (JP); Tsuyoshi Niwata, Tokyo (JP); Yoshiyasu Sugimura, Tokyo (JP); Satoru Nogami, Tokyo (JP); Teruhisa Ninomiya, Kawasaki (JP); Manabu Kai, Kawasaki (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 7 days.

(21) Appl. No.: 13/047,105

(22) Filed: Mar. 14, 2011

(65) Prior Publication Data

US 2011/0315774 A1    Dec. 29, 2011

(30) Foreign Application Priority Data

Jun. 25, 2010    (JP) ................. 2010-144687

(51) Int. Cl.
*G06K 19/06*    (2006.01)
(52) U.S. Cl.
USPC ........................... 235/492; 235/487
(58) Field of Classification Search
USPC ........................... 235/487, 488, 492
See application file for complete search history.

(56) References Cited

U.S. PATENT DOCUMENTS

| | | | |
|---|---|---|---|
| 6,424,315 B1 * | 7/2002 | Glenn et al. | 343/895 |
| 7,382,265 B2 * | 6/2008 | Kwak et al. | 340/572.7 |
| 8,169,322 B1 * | 5/2012 | Zhan et al. | 340/572.7 |
| 2008/0055045 A1 * | 3/2008 | Swan et al. | 340/10.1 |
| 2008/0204196 A1 * | 8/2008 | Baba | 340/10.1 |
| 2009/0108996 A1 * | 4/2009 | Day | 340/10.1 |
| 2009/0160653 A1 * | 6/2009 | Yeh et al. | 340/572.7 |

FOREIGN PATENT DOCUMENTS

| | | |
|---|---|---|
| JP | 2006-065761 A | 3/2006 |
| JP | 2008-004604 A | 1/2008 |
| JP | 2008-117276 A | 5/2008 |
| JP | 2009-026043 A | 2/2009 |
| JP | 2009-231870 A | 10/2009 |
| WO | 2008/027719 A1 | 3/2008 |

OTHER PUBLICATIONS

European Search Report application No. 11158347.2 dated Mar. 7, 2012.
Japanese Office Action application No. 10-2011-0029629 dated Mar. 28, 2012.
Korean Office Action application No. 10-2011-0029629 dated Mar. 28, 2012.

* cited by examiner

*Primary Examiner* — Daniel Hess
*Assistant Examiner* — Paultep Savusdiphol
(74) *Attorney, Agent, or Firm* — Squire Sanders (US) LLP

(57) ABSTRACT

A wireless tag includes a tag-inlet including an antenna pattern formed on a base and an IC chip connected to the antenna pattern on the base, and a flexible member configured to seal the tag-inlet inside the flexible member. In the wireless tag, the tag-inlet is sealed in the flexible member with folded, and the folded tag-inlet has a dielectric spacer formed of the flexible member between the folded tag-inlet.

2 Claims, 12 Drawing Sheets

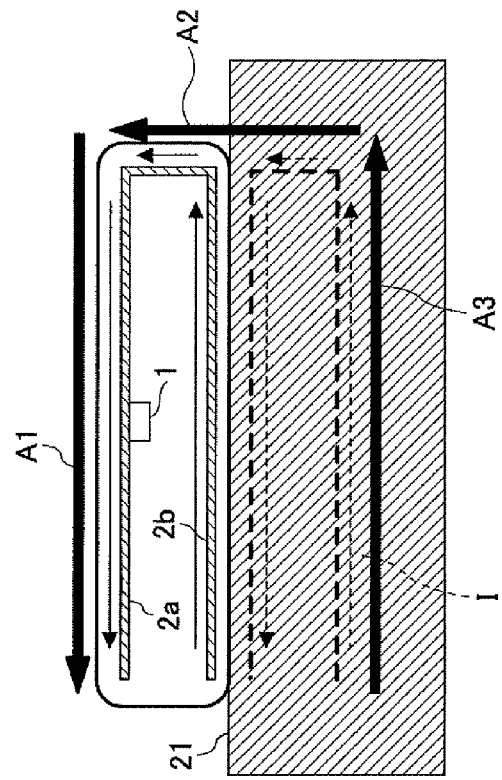
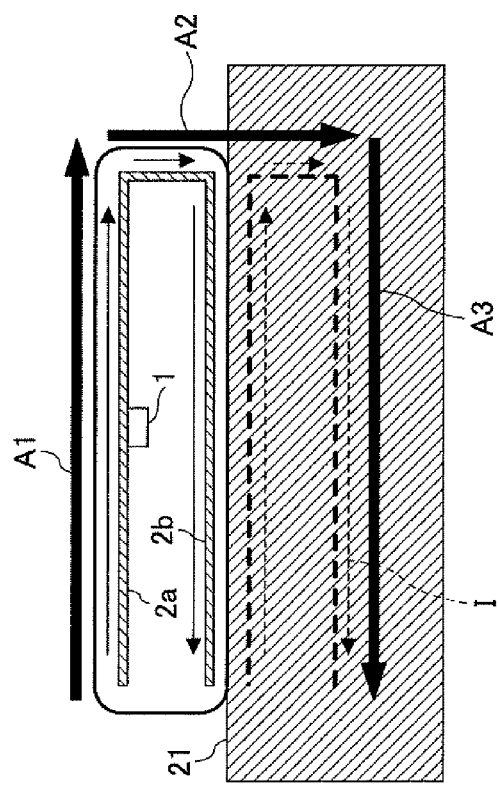

WIRELESS TAG AND MANUFACTURING METHOD

CROSS-REFERENCE TO RELATED APPLICATIONS

This patent application is based upon and claims the benefit of priority of the prior Japanese Patent Application No. 2010-144687 filed on Jun. 25, 2010, the entire contents of which are incorporated herein by reference.

FIELD

The embodiments discussed herein are related to a wireless tag and a method for manufacturing the wireless tag.

BACKGROUND

Among wireless tags, there is a wireless tag known in the art that may be attached to radio-wave reflecting materials such as metallic surfaces or radio-wave absorbing materials such as liquid-containing materials. Japanese Laid-Open Patent Application No. 2008-117276, for example, discloses a non-contact type data transmission/reception object as an example of such a wireless tag that may be attached to the radio-wave reflecting or absorbing materials. Such a non-contact type data transmission/reception object includes a substrate, an adhesive layer formed at both ends in a longitudinal direction of one surface of the substrate, and an inlet including an IC chip and an antenna pattern that is provided via the adhesive layer. In the non-contact type data transmission/reception object, parts of the inlet where the antenna pattern is provided are folded in layers, and a part of the inlet where the IC tag and the antenna pattern are provided is arranged at a position having a predetermined distance from the substrate. Japanese Laid-Open Patent Application No. 2009-231870 discloses a technology on the wireless tag that may be attached to an object regardless of its material. In this technology, a half-loop antenna is attached to a spacer made of dielectric.

The wireless tag (i.e., the non-contact type data transmission/reception object) disclosed in Japanese Laid-Open Patent Application No. 2008-117276 includes a three-dimensional antenna structure that is formed by folding parts of the inlet provided with the antenna pattern in layers. However, since the antenna pattern is not provided beneath the IC chip, image current may not be excited. As a result, the current may not be amplified.

Meanwhile, in the configuration of the wireless tag disclosed in Japanese Laid-Open Patent Application No. 2009-231870, the dielectric spacer is additionally provided. Further, the manufacturing process of this wireless tag may be complicated; for example, the wireless tag may be manufactured by providing a hole in the dielectric spacer, embedding the IC chip in the hole, fixing the antenna pattern on the spacer, and covering the entire tag with a molded material. As a result, the manufacturing cost may be increased.

SUMMARY

According to an aspect of the embodiment, there is provided a wireless tag that includes a tag-inlet including an antenna pattern formed on a base and an IC chip connected to the antenna pattern on the base; and a flexible member configured to seal the tag-inlet thereinside. In the wireless tag, the tag-inlet is sealed in the flexible member with folded, and the folded tag-inlet has a dielectric spacer formed of the flexible member therebetween.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 6A and 6B are diagrams illustrating operations of the RFID tag according to the first embodiment;

DESCRIPTION OF EMBODIMENTS

In the following, embodiments will be described with reference to the accompanying drawings.

First Embodiment

Figure 1:
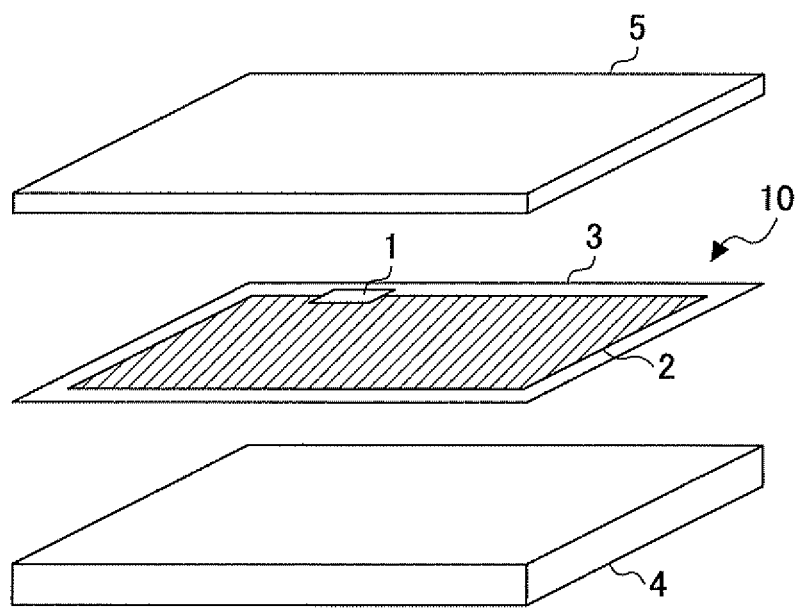
FIG. 1 is a perspective diagram illustrating components of a radio-frequency identification (RFID) tag according to a first embodiment.

FIG. 1 is a perspective diagram illustrating components of a radio-frequency identification (RFID) tag according to a first embodiment. The RFID tag according to the first embodiment includes a first planar rectangular (sheet-like) flexible resin substrate 4 having a predetermined thickness (e.g., 2.5 mm), a second planar rectangular (sheet-like) flexible resin substrate 5 having a thickness less than the predetermined thickness of the first flexible resin substrate 4, and a tag-inlet 10 including a film-like substrate (hereinafter simply called a "film") 3 that includes an integrated circuit (IC) bare chip 1 and an antenna 2 connected to the IC bare chip 1. Note that examples of a material for the first and the second flexible resin substrates 4 and 5 include rubber having insulation properties, and preferably silicone rubber with durability. Examples of a material for the film 3 include polyester resin such as polyethylene terephthalate (PET), and polyethylenenaphthalate (PEN). The film 3 may be a single layer or a composite film, and may have a thickness range of 150 to 500 µm. Note also that the IC 1 is not limited to a bare chip but may be packaged (i.e., IC package).

Figure 2:
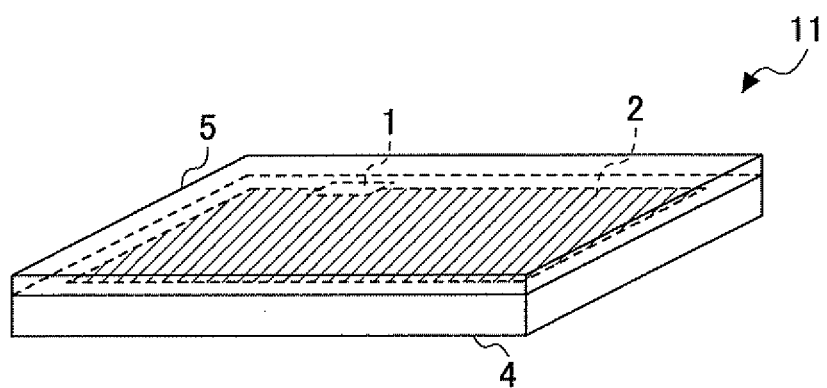
FIG. 2 is a perspective diagram illustrating a tag-sealed member.

FIG. 2 is a perspective diagram illustrating a tag-sealed member 11 formed by sealing respective surfaces of the tag-inlet 10 to the first and second flexible resin substrates 4 and 5, with the tag-inlet 10 being sandwiched between the first and second flexible resin substrates 4 and 5. In the tag-sealed member 11, the antenna 2 formed on the film 3 is extended (spread) in planar directions of the first and second flexible resin substrates 4 and 5.

Figure 3:
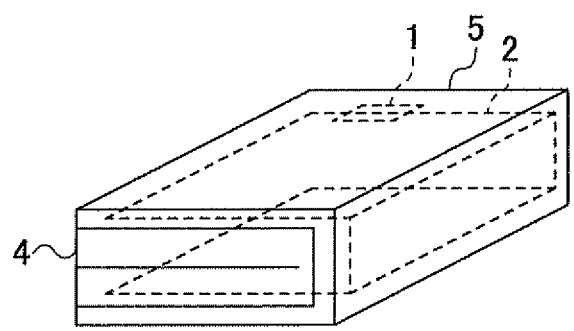
FIG. 3 is a perspective diagram illustrating the RFID tag formed by folding the tag-sealed member.

FIG. 3 is a diagram illustrating the RFID tag formed by folding the tag-sealed member 11, and bonding or welding the surfaces of the folded tag-sealed member 11 illustrated in FIG. 2 such that the IC 1 and the antenna 2 are overlapped.

Figure 4A:
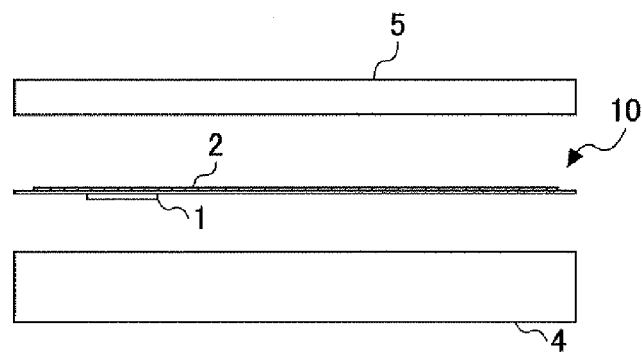
FIGS. 4A, 4B, and 4C are diagrams illustrating manufacturing steps of the RFID tag according to the first embodiment.
Figure 4B:
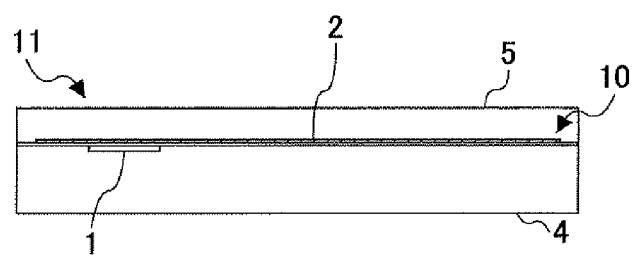
Figure 4C:
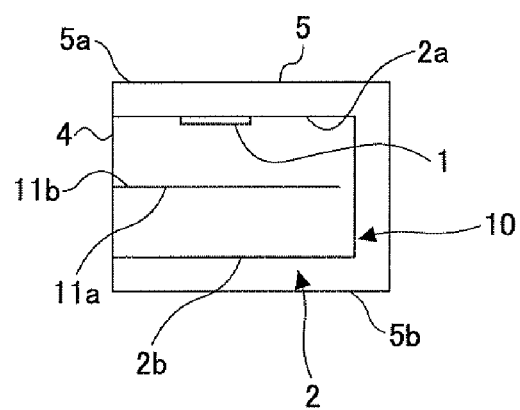

FIGS. 4A, 4B, and 4C are diagrams illustrating manufacturing steps of the RFID tag according to the first embodiment. In the following, a method for manufacturing RFID tag according to the first embodiment is described with reference to FIGS. 1 through 4C. As illustrated in FIGS. 4A and 4B, the tag-inlet 10 is sandwiched between the first and second flexible resin substrates 4 and 5, which are then welded, or sealed with adhesive. The tag-sealed member 11 is thus obtained. Subsequently, as illustrated in FIG. 4C, the tag-sealed member 11 is folded approximately in the middle so that a folded dielectric spacer formed of the flexible resin substrate 4 resides between the IC 1 and a lower part antenna 2b (of the antenna 2), and overlapped surfaces 11a and 11b of the folded dielectric spacer formed of the flexible resin substrate 4 are then bonded or welded, thereby obtaining the RFID tag. Note that in the first embodiment, since the IC 1 is sealed in a direction toward the flexible resin substrate 4 and the tag-sealed member 11 is folded in the manner illustrated in FIG. 4C, the IC 1 may effectively be protected from external force.

In this case, the second flexible resin substrate 5 is folded to form an upper surface 5a and a lower surface 5b. The IC 1 located at the upper surface 5a side of the second flexible resin substrate 5 faces the lower part antenna 2b located at the lower surface 5b side of the second flexible resin substrate 5 such that the IC 1 and the lower part antenna 2b are mutually overlapped via the dielectric spacer formed of the flexible resin substrate 4. The antenna 2 of the RFID tag according to the first embodiment thus includes a three-dimensional antenna configuration.

Figure 5:
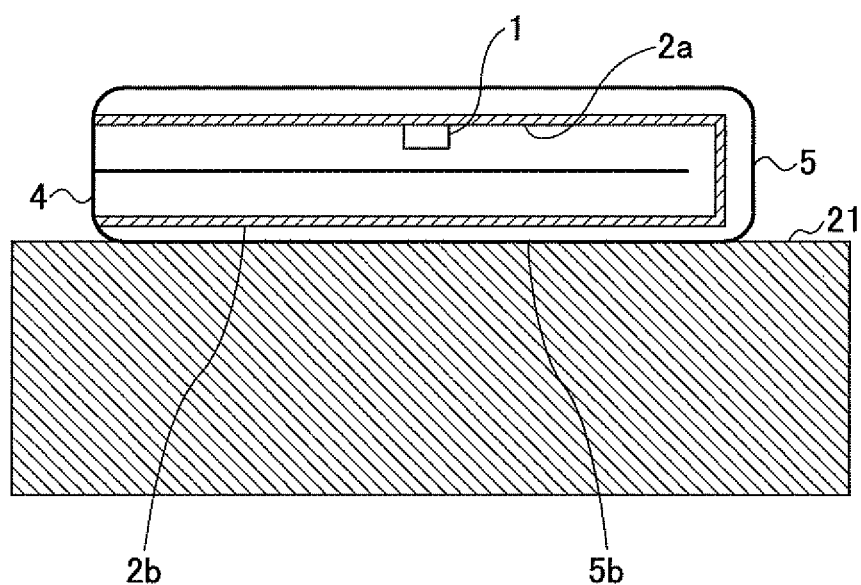
FIG. 5 is a side diagram illustrating the RFID tag attached to a metallic object.

The RFID tag thus formed is attached to a metallic object such that the lower surface 5b of the second flexible resin substrate 5 is attached to a metallic surface 21 of the metallic object as illustrated in FIG. 5. Note that the lower surface 5b of the second flexible resin substrate 5 corresponds to a portion where the lower surface 5b itself and the first flexible resin substrate 4 sandwich the lower antenna 2b.

The RFID tag according to the first embodiment is attached to the metallic surface 21 of the metallic object such that the IC 1 and the lower part antenna 2b are arranged in a mutually overlapped manner. Accordingly, the antenna 2 may include the three-dimensional antenna configuration as illustrated in FIGS. 6A and 6B. With this configuration, the current flowing in the lower part antenna 2b located at a lower side (i.e., the metallic surface 21 side) creates a virtual image current I in the metallic conductor (i.e., the metallic object). With the virtual current I, a large virtual loop antenna (the size indicated by A1, A2, and A3) is created and hence a communication distance may be extended. Note that FIGS. 6A and 6B illustrate respective currents flowing in mutually opposite directions induced by alternating current.

Figure 7A:
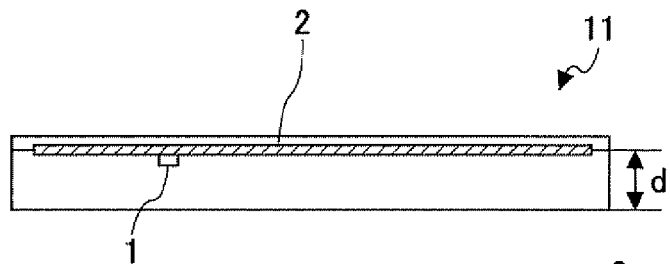
FIGS. 7A and 7B are side diagrams illustrating a first modification of the RFID tag according to the first embodiment.
Figure 7B:
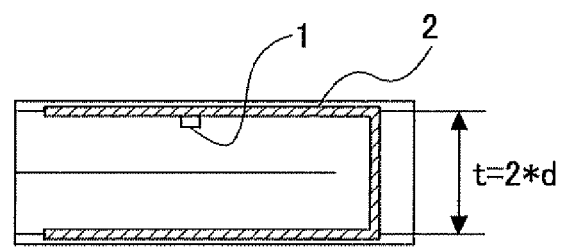
Figure 8A:
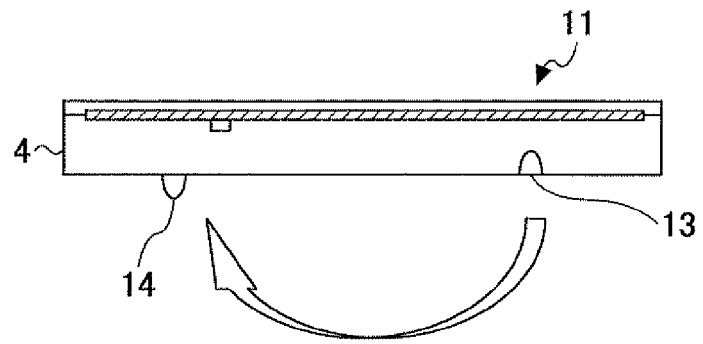
FIGS. 8A and 8B are side diagrams illustrating a second modification of the RFID tag according to the first embodiment.
Figure 8B:
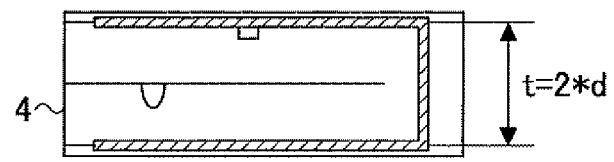

Note that as illustrated in FIGS. 7A and 7B, it is preferable that the thickness of the first flexible resin substrate 4 be at least a half of the thickness t (e.g., at least 2.5 mm), which may be required as a thickness of the spacer to form the three-dimensional antenna. Further, to facilitate folding of the tag-sealed member 11 illustrated in FIG. 7A, a combination of a recess 13 and a projection 14 may be provided on the first flexible resin substrate 4 as a locator. Accordingly, the recess 13 and the projection 14 mutually engage to function as the locator when the first flexible resin substrate 4 is folded as illustrated in FIGS. 8A and 8B.

Figure 9A:
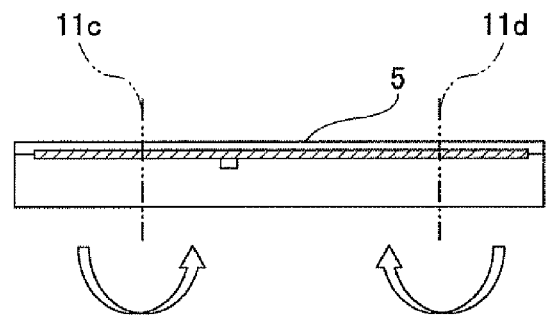
FIGS. 9A and 9B are side diagrams illustrating a third modification of the RFID tag according to the first embodiment.
Figure 9B:
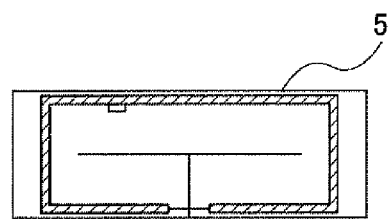
Figure 10A:
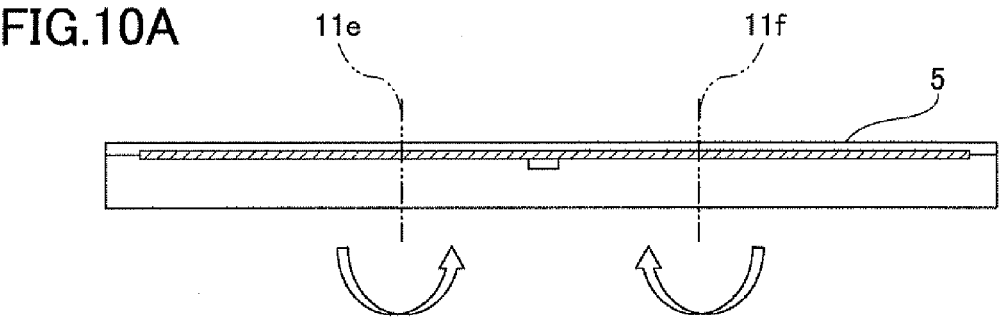
FIGS. 10A and 10B are side diagrams illustrating a fourth modification of the RFID tag according to the first embodiment.
Figure 10B:
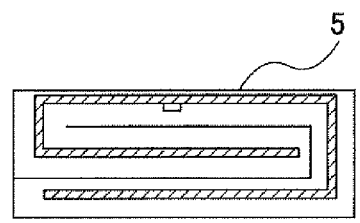

Further, the tag-sealed member 11 described in the above example is folded once approximately in the middle. However, the tag-sealed member 11 may alternatively be downwardly folded once at each of two positions 11c and 11d of the tag-sealed member 11 to abut as illustrated in FIGS. 9A and 9B. Moreover, the tag-sealed member 11 may be folded at two positions 11e and 11f of the tag-sealed member 11 such that the antenna pattern of the tag-sealed member 11 is folded in multiple layers (e.g., three layers in FIG. 10B) to overlap as illustrated in FIGS. 10A and 10B. As a result, an overlapped loop antenna may be formed as illustrated in FIG. 10B. Note that in the examples of the abutted longer loop antenna and the overlapped loop antenna, the second flexible resin substrate 5 forms the upper and lower surfaces of the RFID tag.

Second Embodiment

The RFID tag according to the first embodiment includes a half-loop antenna that is formed with the tag-inlet on the film. An RFID tag according to a second embodiment described below includes a planer inverted F antenna.

FIGS. 11A through 11D are diagrams illustrating manufacturing steps of the RFID tag having the planer inverted F antenna according to the second embodiment, and FIGS. 12A through 12E are diagrams illustrating manufacturing steps of a related art RFID tag including an inverted F antenna that is employed as a comparative example for the second embodiment. Note that in FIGS. 11A through 11D and FIGS. 12A through 12E, components identical to or similar to those of the first embodiment are provided with the same reference numerals.

Figure 11A:
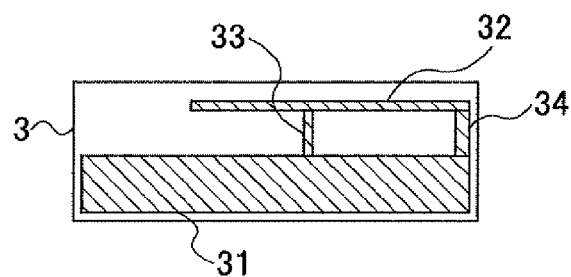
FIGS. 11A through 11D are diagrams illustrating manufacturing steps of an RFID tag including a tag-inlet having a planer inverted F antenna according to a second embodiment.
Figure 11B:
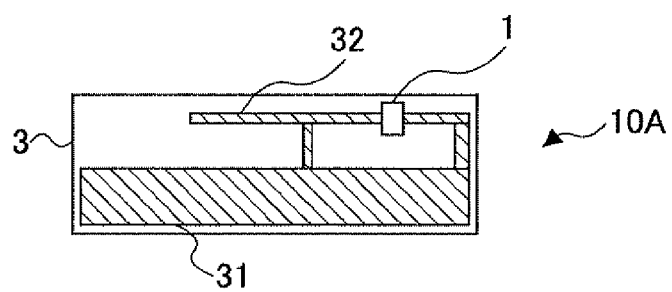
Figure 11C:
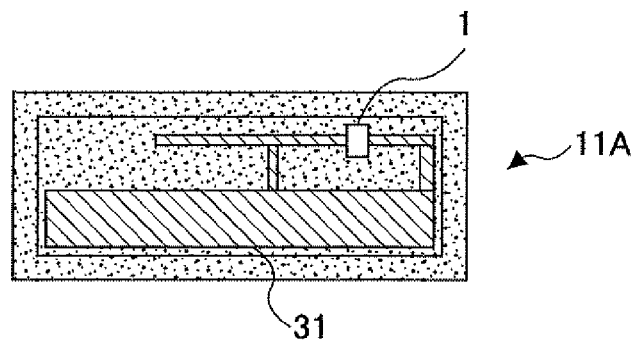

First, as illustrated in FIG. 11A, the planer inverted F antenna is formed as a pattern including a substrate portion 31, a main body portion 32, a short-circuit portion 33, and a power-supply portion 34 on a film (a base member) 3 in step S1. Subsequently, as illustrated in FIG. 11B, an IC (i.e., an IC chip) 1 is provided in the main body portion 32 to thereby form a tag-inlet 10A in step S2. Then, as illustrated in FIG. 11C, upper and lower surfaces of the tag-inlet 10A including the planer inverted F antenna are sealed with flexible resin such as silicone rubber to thereby form a tag-sealed member 11A in step S3. Note that the flexible resin such as silicone rubber may be used as the second flexible resin substrate 5 to seal the lower surface of the tag-inlet 10A and also used as the first flexible resin substrate 4 having a thickness greater than that of the second flexible resin substrate 5 to seal the upper surface of the tag-inlet 10A.

Figure 11D:
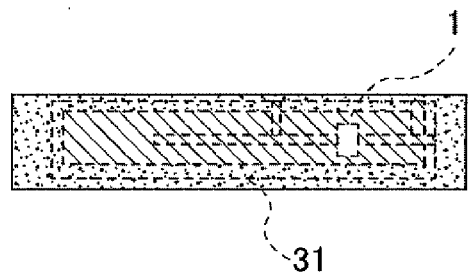

As illustrated in FIG. 11D, when the tag-sealed member 11A is formed, the tag-sealed member 11A including the pattern that includes the substrate portion 31, the main body portion 32 to which the IC 1 is provided, the short-circuit portion 33, and the power-supply portion 34 is folded at one position such that the IC 1 is downwardly directed, and overlapped portions of the tag-sealed member 11A are bonded to thereby form the RFID tag in step S4. Note that the tag-sealed member 11A is folded at one position such that the second flexible resin substrate 5 forms the upper and lower surfaces of the RFID tag, and the first flexible resin substrate 4 is sandwiched between the substrate portion 31 and the main body portion 32. As a result, the tag-sealed member 11A may function as the dielectric spacer.

Figure 12A:
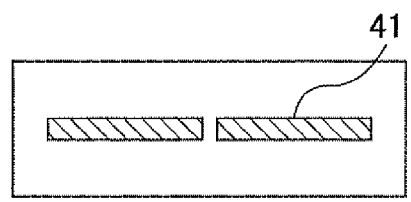
FIGS. 12A through 12E are diagrams illustrating manufacturing steps of a related art RFID tag that is a comparative example of the RFID tag according to the second embodiment.
Figure 12B:
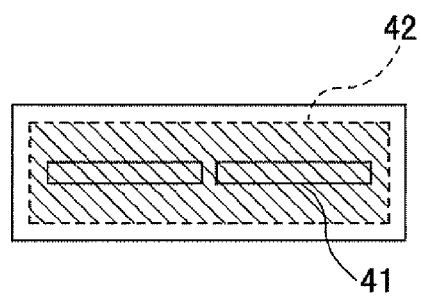
Figure 12C:
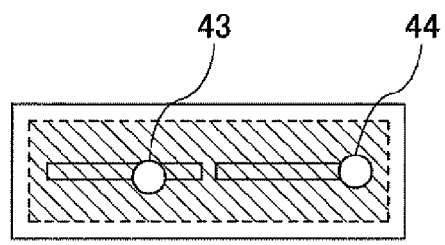
Figure 12D:
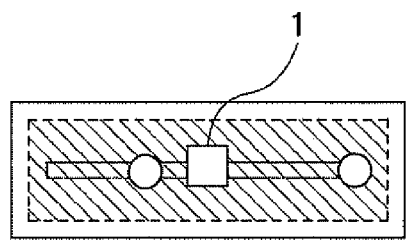
Figure 12E:
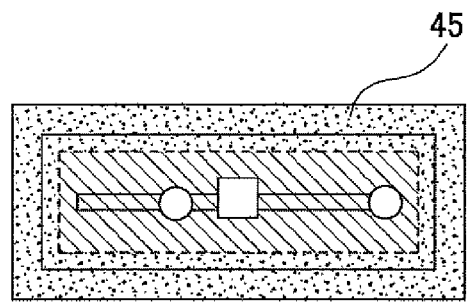

FIGS. 12A through 12E are diagrams illustrating manufacturing steps of the related art RFID tag that is employed as the comparative example corresponding to the manufacturing steps of the RFID tag according to the second embodiment illustrated in FIGS. 11A through 11D. In the manufacturing steps of the related art RFID tag, a front surface pattern 41 is formed in step P1 and a rear surface pattern 42 is formed in step P2 as illustrated in FIGS. 12A and 12B. As illustrated in FIGS. 12C and 12D, via-holes 43 and 44 are then formed in the front surface pattern 41 and the rear surface pattern 42 such that parts of the front surface pattern 41 and the rear surface pattern 42 are in communication through the via-holes 43 and 44 in step P3, and an IC (an IC chip) 1 is then provided on the obtained product in step P4. As illustrated in FIG. 12E, the obtained product on which the IC 1 is provided is then sealed with an outer layer formed of a flexible resin 45 in step P5.

In comparing the manufacturing steps of the RF tag according to the second embodiment illustrated in FIGS. 11 through 11D and those of the comparative example of the related art RF tag illustrated in FIGS. 12A though 12E, the manufacturing steps of the RF tag according to the second embodiment do not include the step of forming the via-holes. Accordingly, since there are fewer steps in the manufacturing steps of the second embodiment, the RFID tag according to the second embodiment may be manufactured simpler and at lower cost.

Figure 13A:
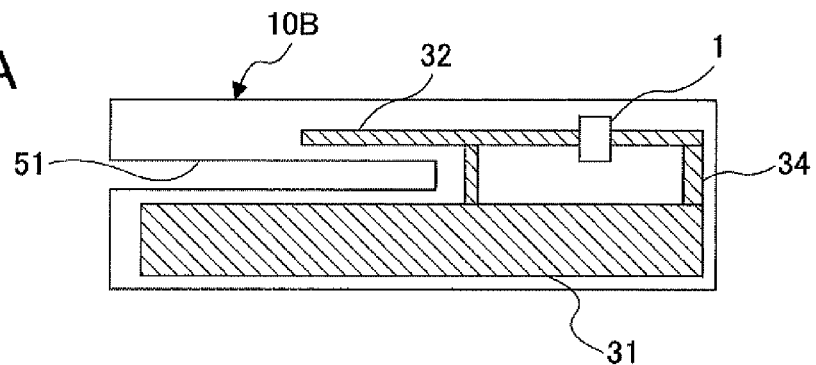
FIGS. 13A, 13B, and 13C are diagrams illustrating a modification of the RFID tag according to the second embodiment.
Figure 13B:
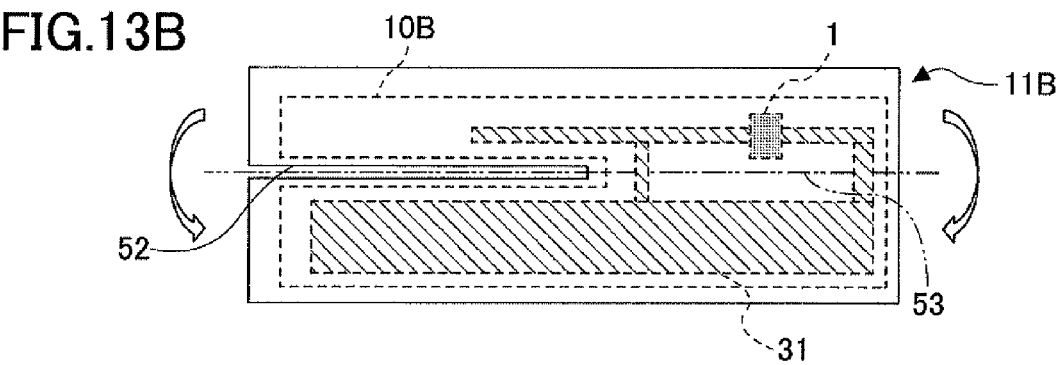
Figure 13C:
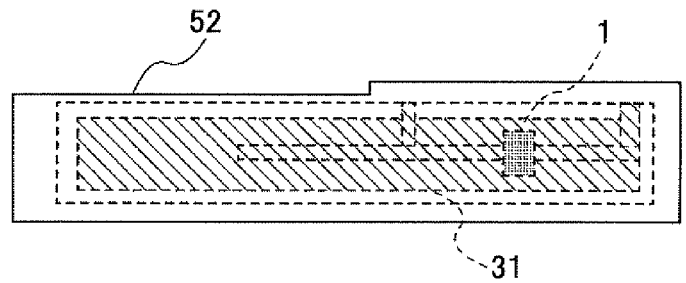

FIGS. 13A, 13B, and 13C are diagrams illustrating a modification of the RFID tag according to the second embodiment and its manufacturing steps. As illustrated in FIG. 13A, a recess (or a slit) 51 is formed at a bending portion of a film of a tag-inlet 10B, and a recess (or a slit) 52 or folding line 53 is provided in a tag-sealed member 11B that is formed by sealing the tag-inlet 10B as illustrated in FIG. 13B. As illustrated above, providing the recess (or the slit) 51 in the tag-inlet 10B or providing the recess (or the slit) 52 or the folding line 53 in the tag-sealed member 11B may facilitate folding of the tag-sealed member 11B when the tag-sealed member 11B is folded in a manner as illustrated in FIG. 13C.

Third Embodiment

Figure 14A:
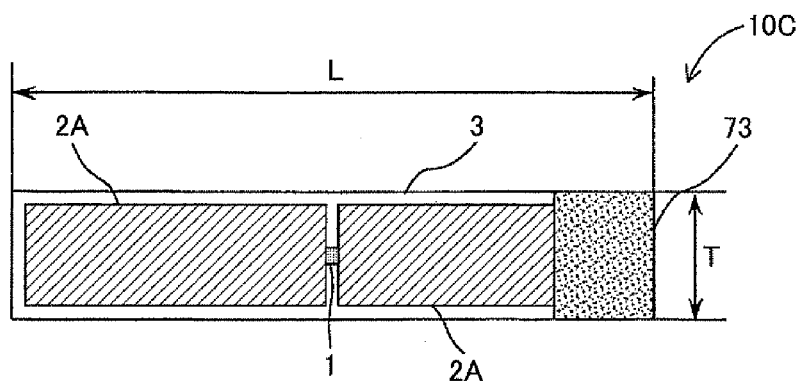
FIGS. 14A through 14E are diagrams illustrating a first part of a method for manufacturing an RFID tag according to a third embodiment.
Figure 14B:
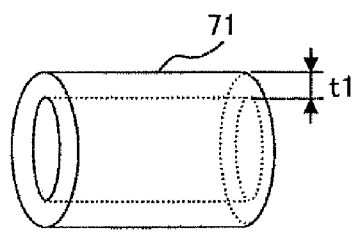
Figure 14C:
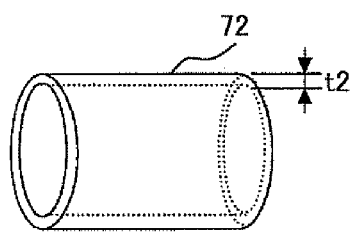

FIGS. 14A through 14E are diagrams illustrating a first example of a method for manufacturing an RFID tag according to a third embodiment that includes a loop antenna formed with a tag-inlet. FIGS. 15A through 15E are diagrams illustrating a second example of the method for manufacturing the RFID tag according to the third embodiment. As illustrated in FIG. 15E, the RFID tag according to the third embodiment includes a spacer formed by flattening an inner space of a first flexible resin tube (i.e., an inner tube) 71 and mutually bonding an inner surface of the flexible resin tube 71; a tag-inlet 10C formed by forming an IC 1 and an antenna 2A connected to the IC 1 on a film, the tag-inlet 10C being provided on an outer surface of the spacer; and a second flexible resin tube (i.e., an outer tube) 72 provided in the periphery of the spacer on the outer surface of which the tag-inlet 10C is provided to seal the tag-inlet 10C. In the third embodiment, silicone rubber having insulating properties may also be used for the first flexible resin tube 71 and the second flexible resin tube 72 in the same manner as the first flexible resin substrate 4 and the second flexible resin substrate 5 in the first embodiment. Further, polyethylene, polypropylene, and PET (polyethylene terephthalate) each having insulating properties may also be used as a flexible film for the tag-inlet 10C in the same manner as the film 3 if the tag-inlet 10 in the first embodiment.

In the following, the method for manufacturing the RFID tag according to the third embodiment is described with reference to FIGS. 14 through 14E, and also to FIGS. 15A through 15E. As illustrated in FIGS. 14A through 14C, first, the tag-inlet 10C, the inner tube (i.e., the first tube or the spacer) 71, the outer tube (i.e., the second tube or the sealing tube) 72 are prepared. The tag-inlet 10C illustrated in FIG. 14A is formed by placing the IC 1 approximately in a middle portion of a rectangular film 3 and forming patterns of a loop antenna 2A at both sides of the rectangular film 3. A double-faced adhesive tape 73 is provided as an adhesive member at an end of the tag-inlet 10C. Note that the tag-inlet 10C includes the length L of approximately 90 mm and the width T of approximately 10 mm in this example.

The inner tube 71 illustrated in FIG. 14B is formed of the flexible resin that is silicone rubber, and the outer tube 72 illustrated in FIG. 14C is also formed of the flexible resin that is silicone rubber. The thickness t2 of the outer tube 72 may be less than the thickness t1 of the inner tube 71. For example, the thickness t1 of the inner tube 71 may be 1.7 mm, and the thickness t2 of the outer tube 72 may be 0.3 mm.

Figure 14D:
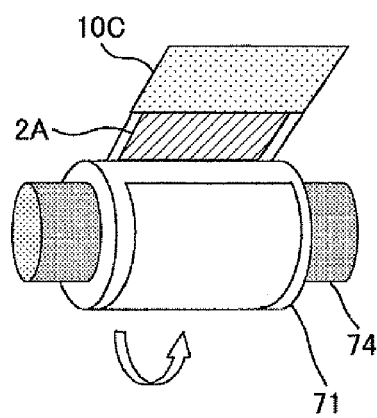
Figure 14E:
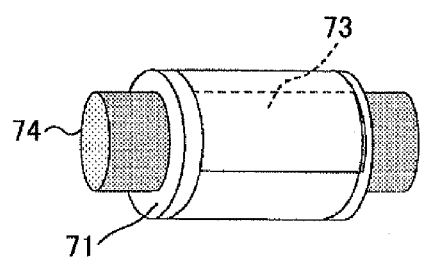

As illustrated in FIG. 14D, a shaft 74 may be inserted into the inner tube 71 and the tag-inlet 10C is wrapped around the outer periphery of the inner tube 71. In this example, if the ends of the antenna 2A are overlapped by the wrapping of the tag-inlet 10C around the inner tube 71, the overlapped ends of the antenna 2A may be configured not to make electrical contact. Finally, a farthest end of the tag-inlet 10C is bonded to the inner tube 71 using the double-faced adhesive tape 73 as illustrated in FIG. 14E.

Figure 15A:
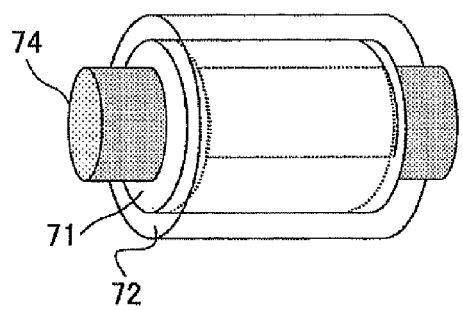
FIGS. 15A through 15E are diagrams illustrating a second part of the method for manufacturing an RFID tag according to the third embodiment.
Figure 15B:
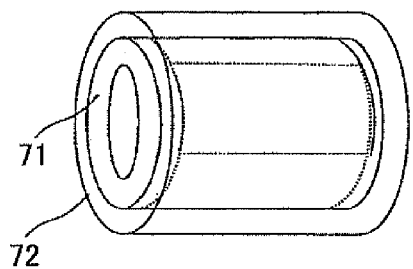
Figure 15C:
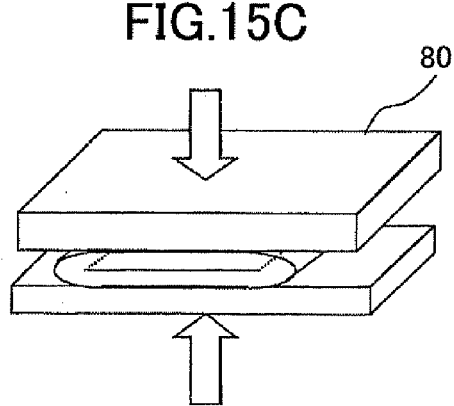
Figure 15D:
Figure 15E:
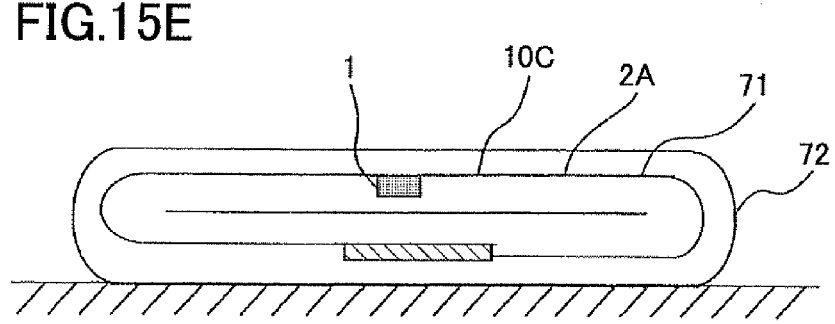

Next, as illustrated in FIG. 15A, the inner tube 71 wrapped by the tag-inlet 10C is inserted into the outer tube 72 such that the inner tube 71 wrapped by the tag-inlet 10C is enclosed by the outer tube 72. As illustrated in FIG. 15B, when the inner tube 71 wrapped by the tag-inlet 10C is inserted into the outer tube 72, the shaft 74 is pulled out of the inner tube 71. As illustrated in FIG. 15C, the outer tube 72 is, together with the inner tube 71, flattened by a press 80. As a result, spaces inside the tubes 71 and 72 are removed as illustrated in FIG. 15D. Then, the respective inner surfaces of the inner tube 71 and the outer tube 72 are mutually bonded with adhesive, such that the flatness of the inner tube 71 and the outer tube 72 is maintained. Accordingly, the antenna 2A of the tag-inlet 10C wrapped around the inner tube 71 may have a three-dimensional configuration as illustrated in FIG. 15E. Note that in FIG. 15E, the ends of the antenna 2A are overlapped such that they are not brought into contact with each other. That is, the overlapped ends of the antenna 2A are configured such that they form capacitive coupling to function as an antenna.

In the above configuration, the flattened inner tube 71 (i.e., the first tube) may function as a dielectric spacer as illustrated in FIG. 15E. Further, the outer tube 72 may function as a sealer to seal the tag-inlet 10C, and an outer surface of the outer tube 72 may be attached to the metallic surface of the metallic target body.

Note that the antenna 2A in this example may be a half loop antenna or a planer inverted F antenna instead of the loop antenna. Note also that the silicone rubber is used as an example of the flexible resin in this example; however, nitril-butadiene rubber (NBr) or SB (styrene-butadiene) rubber may also be used as the flexible resin. Note also that polyester resin such as PET (polyethylene terephthalate) and PEN (polyethylene naphthalate) are given as examples of the material for the base film 3, which may be used as a base film for the tag-inlet 10C in this example. However, diacetate resin, triacetate resin, acrylic resin, polycarbonate resin, triacetyl cellulose, polystyrene, polyolefin, polyurethane resin, polyvinyl chloride, polyimide resin, polyamide resin, and the like may also be used as the examples of the material for the base film 3.

As described above, in the RFID tag according to the above embodiments, since the first flexible resin substrate includes a sealing function to seal the tag-inlet and a spacer function, the RFID tag may be manufactured with a lesser number of components at lower cost. Further, since a low-k (low-dielectric constant) material such as a general silicone rubber is used as the spacer, the RFID tag according to the above embodiments may be manufactured at lower cost. In addition, since there are only four steps for forming protection to protect the entire tag-inlet, forming the spacer and forming the three-dimensional antenna, the entire manufacturing process for the RFID tag may be simplified. Moreover, since the three-dimensional antenna is formed in the RFID tag according to the above embodiments, the RFID tag may have an equivalent communication distance with that of an expensive RFID tag having a spacer formed of a high-k (high-dielectric constant) material. Note that the size of the RFID tag according to the above embodiments may be approximately ¼ of that of the RFID tag that includes a planer antenna formed of a low-k spacer such as sponge. Further, the manufacturing cost of the RFID tag according to the above embodiments may be approximately ⅕ of that of the RFID tag having the high-k spacer or the loop antenna. Thus, it may be possible to manufacture a compact RFID tag at a low cost.

According to the embodiments and modifications, it may be possible to manufacture a smaller wireless tag at lower cost without reducing a communication distance, and facilitate the method for manufacturing such a wireless tag.

The embodiments or modifications may be carried out in various modes without departing from the sprit or the gist thereof. All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. The scope of the invention should therefore be determined only by the following claims and their equivalents in which all terms are to be understood in their broadest reasonable sense unless otherwise indicated. Although the embodiments of the present invention have been described in detail, it should be understood that the various changes, substitutions, and alterations could be made hereto without departing from the spirit and scope of the invention.

What is claimed is:

1. A method for manufacturing a wireless tag, comprising:
    attaching an adhesive member at an end of a tag-inlet including an antenna pattern and an IC chip connected to the antenna pattern formed on a base;
    wrapping the tag-inlet including the antenna pattern and the IC chip around a first cylindrical tube used as a spacer in a cylindrical shape such that portions of the antenna pattern have no electrical contact;
    bonding the tag-inlet including the antenna pattern and the IC chip around the first cylindrical tube with the adhesive member;
    inserting the first cylindrical tube around which the tag-inlet including the antenna pattern and the IC chip is bonded into a second cylindrical tube; and
    flattening internal diameters of the first and second cylindrical tubes to fix flattened shapes of the first and second cylindrical tubes such that the antenna pattern forms a three-dimensional configuration.
2. The method as claimed in claim 1,
    wherein the tag-inlet having the IC chip and the antenna pattern is wrapped around the first cylindrical tube used as the spacer such that the portions of the antenna pattern are overlapped.

\* \* \* \* \*